(12) United States Patent
Minneman et al.

(10) Patent No.: US 8,887,707 B2
(45) Date of Patent: Nov. 18, 2014

(54) CLAY BIRD THROWER

(71) Applicants: Allen J. Minneman, Union, OH (US); Steven W. Minneman, Clayton, OH (US)

(72) Inventors: Allen J. Minneman, Union, OH (US); Steven W. Minneman, Clayton, OH (US)

(73) Assignee: MTM Molded Products Company, Dayton, OH (US)

( * ) Notice: Subject to any disclaimer, the term of this patent is extended or adjusted under 35 U.S.C. 154(b) by 0 days.

(21) Appl. No.: 13/964,265

(22) Filed: Aug. 12, 2013

(65) Prior Publication Data

US 2013/0319386 A1 Dec. 5, 2013

Related U.S. Application Data

(62) Division of application No. 12/871,111, filed on Aug. 30, 2010, now Pat. No. 8,539,939.

(60) Provisional application No. 61/257,252, filed on Nov. 2, 2009.

(51) Int. Cl.
| | |
|---|---|
| *F41B 3/03* | (2006.01) |
| *F41B 3/04* | (2006.01) |
| *A01K 15/02* | (2006.01) |
| *F41J 9/28* | (2006.01) |

(52) U.S. Cl.
CPC ... *F41J 9/28* (2013.01); *F41B 3/04* (2013.01); *A01K 15/025* (2013.01)
USPC ............................................................ 124/5

(58) Field of Classification Search
CPC ........... F41B 3/04; F41B 3/03; A63B 59/025; A63B 65/12; A63B 65/122; A63B 2059/0081; A63B 67/06; A01K 39/014; A63H 33/18
USPC .......... 124/5, 8; 473/511, 512, 552; D22/113, D22/114
See application file for complete search history.

(56) References Cited

U.S. PATENT DOCUMENTS

| | | |
|---|---|---|
| 602,123 A | 4/1898 | Brandon |
| 1,700,880 A | 2/1929 | Camp |
| 2,124,738 A | 7/1938 | Johnsen |
| 4,076,004 A | 2/1978 | Huelskamp |
| D249,815 S | 10/1978 | Huelskamp |
| 4,222,361 A | 9/1980 | Jackson et al. |
| 4,233,952 A | 11/1980 | Perkins |
| 4,347,828 A | 9/1982 | Bridgeman |
| 4,548,413 A | 10/1985 | David |
| 4,730,595 A | 3/1988 | Glass et al. |
| 4,890,889 A | 1/1990 | Burgett |
| 4,974,574 A | 12/1990 | Cutlip |
| 4,984,556 A | 1/1991 | Glass et al. |
| 5,390,652 A | 2/1995 | Minneman et al. |

(Continued)

*Primary Examiner* — Gene Kim
*Assistant Examiner* — Amir Klayman
(74) *Attorney, Agent, or Firm* — Jacox, Meckstroth & Jenkins

(57) ABSTRACT

A hand held disk thrower consisting of a pivoting extended arm and launching head connected to a gripping handle that allows a wide ratios secondary action. The throwing head and arm section are designed to grip the clay target in a semicircular channeled head that offers some resistance to releasing. The arm is lengthened and arched to create both drag and centrifugal force. The launch head and arm section are attached to the handle by a pivoting joint that allows for free or flopping movement of head arm section. The combination head and launch arm and handle are constructed of a semi-rigid plastic. The thrower is designed to release a spinning disk when swung in an arc by the person grasping the handle.

14 Claims, 8 Drawing Sheets

(56) References Cited

U.S. PATENT DOCUMENTS

| | | |
|---|---|---|
| 5,465,704 A | 11/1995 | Kohl |
| 5,515,835 A | 5/1996 | Minneman et al. |
| 5,537,985 A | 7/1996 | Kohl |
| D374,702 S | 10/1996 | Parks |
| 5,579,748 A | 12/1996 | Kohl |
| 6,076,829 A | 6/2000 | Oblack |
| D524,901 S | 7/2006 | Buboltz |
| 7,523,915 B2 | 4/2009 | Halpin et al. |
| D622,804 S | 8/2010 | Minneman |

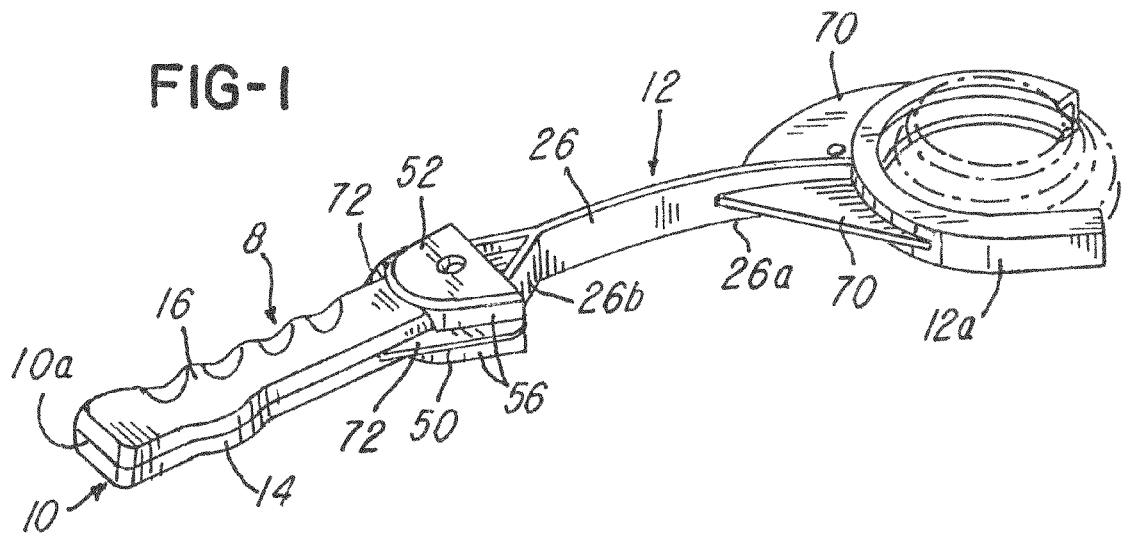
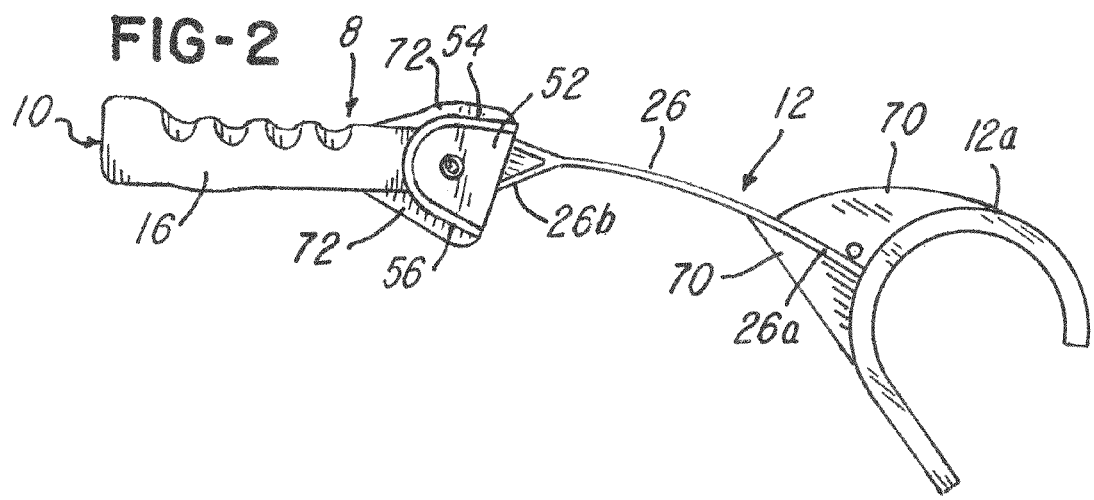
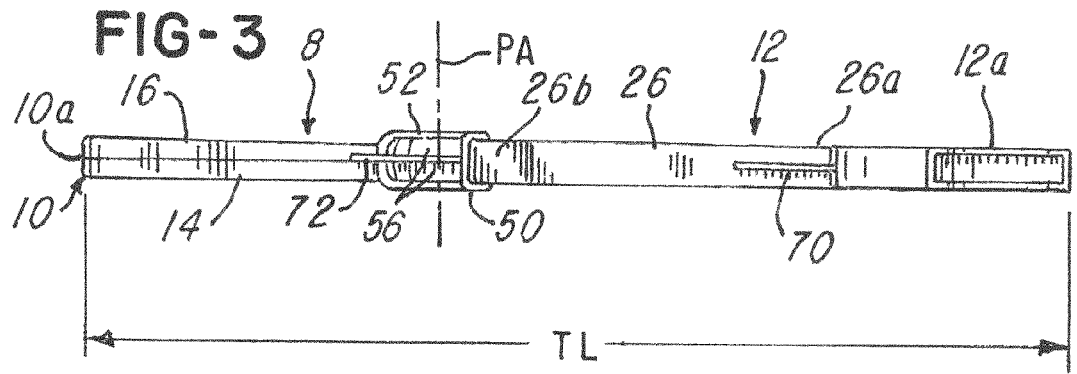

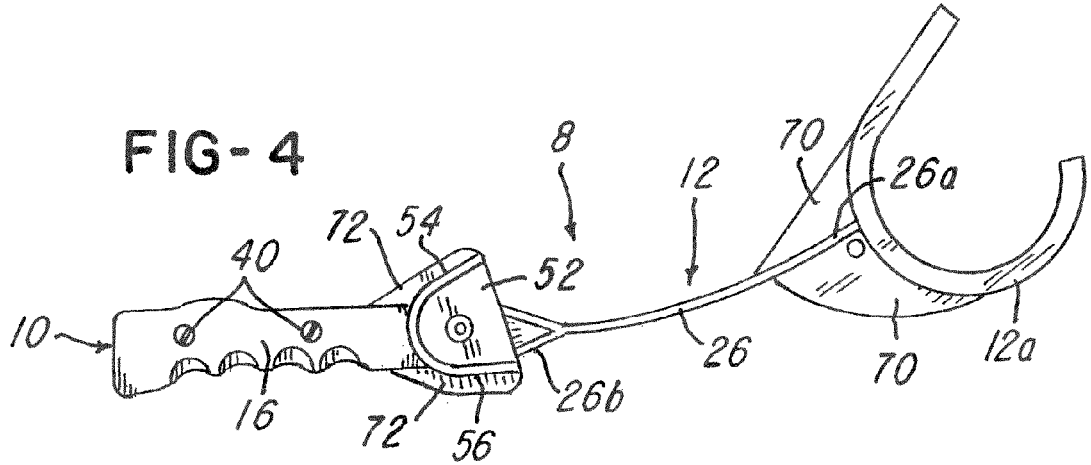
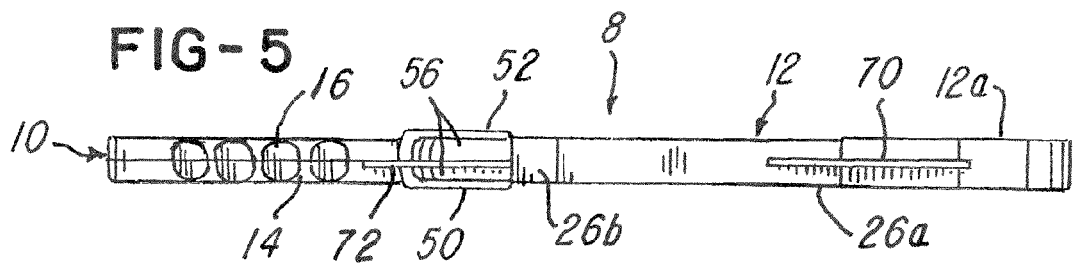
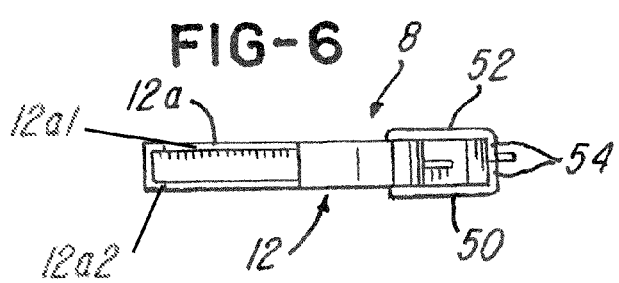
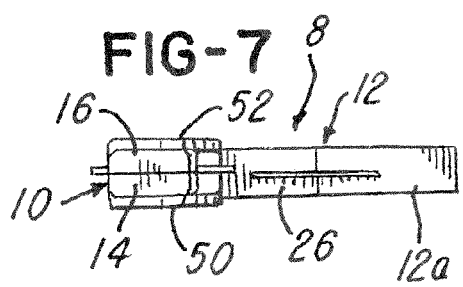

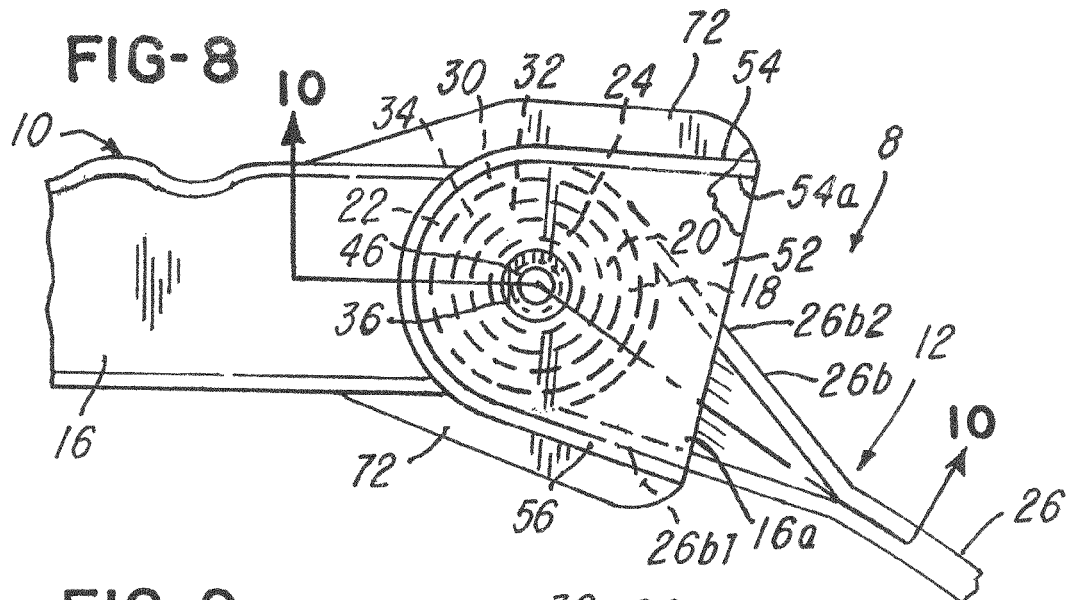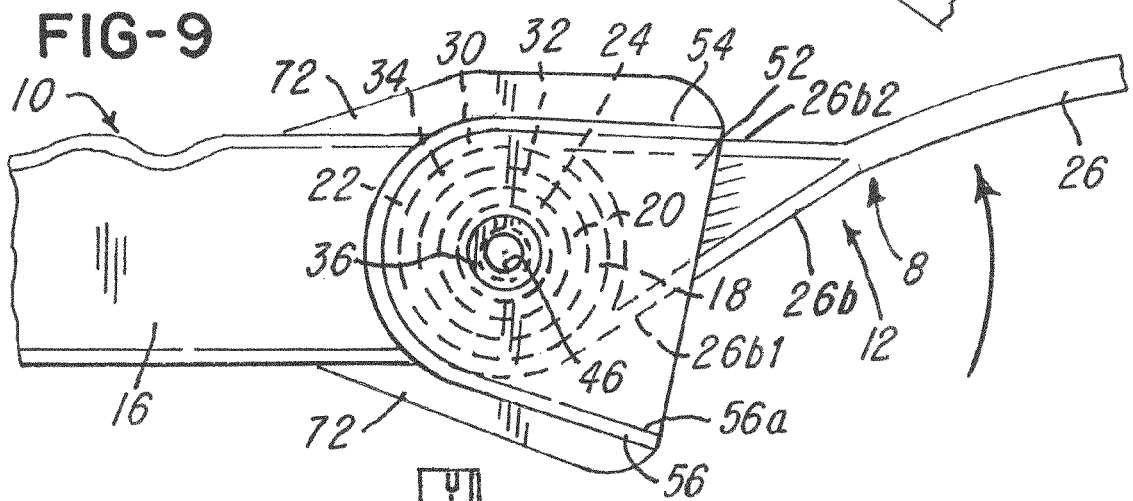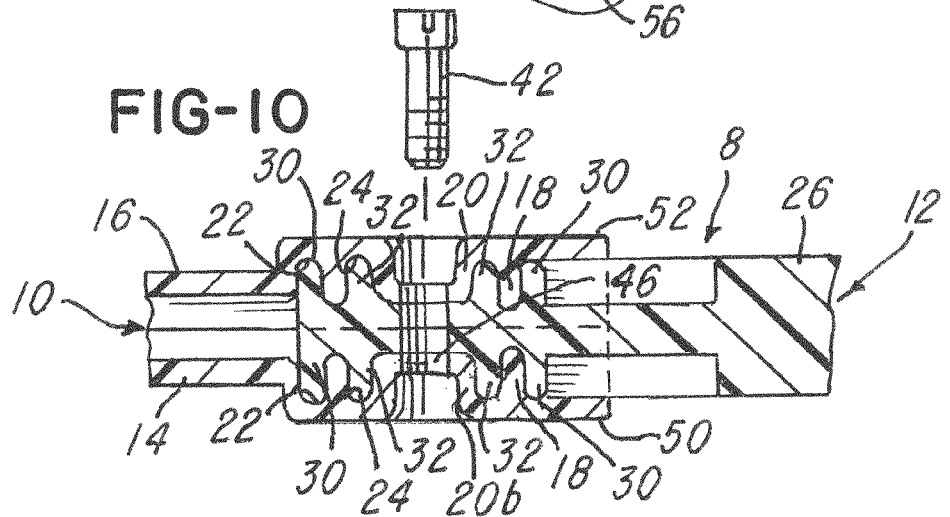

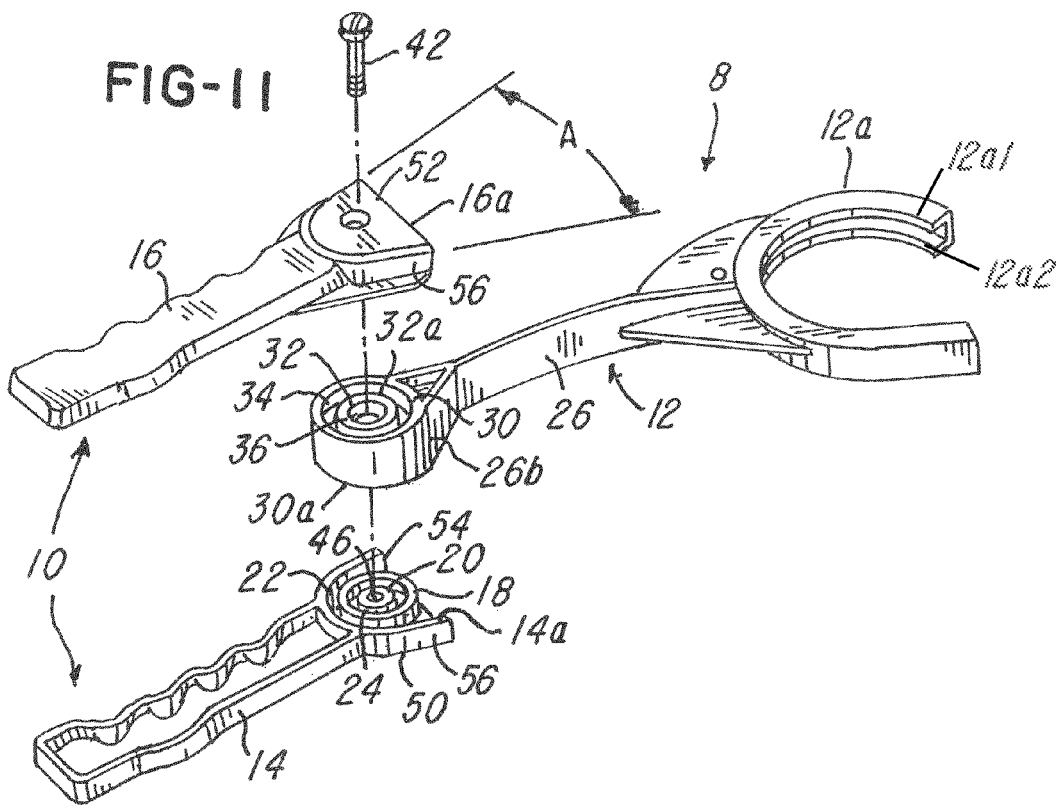

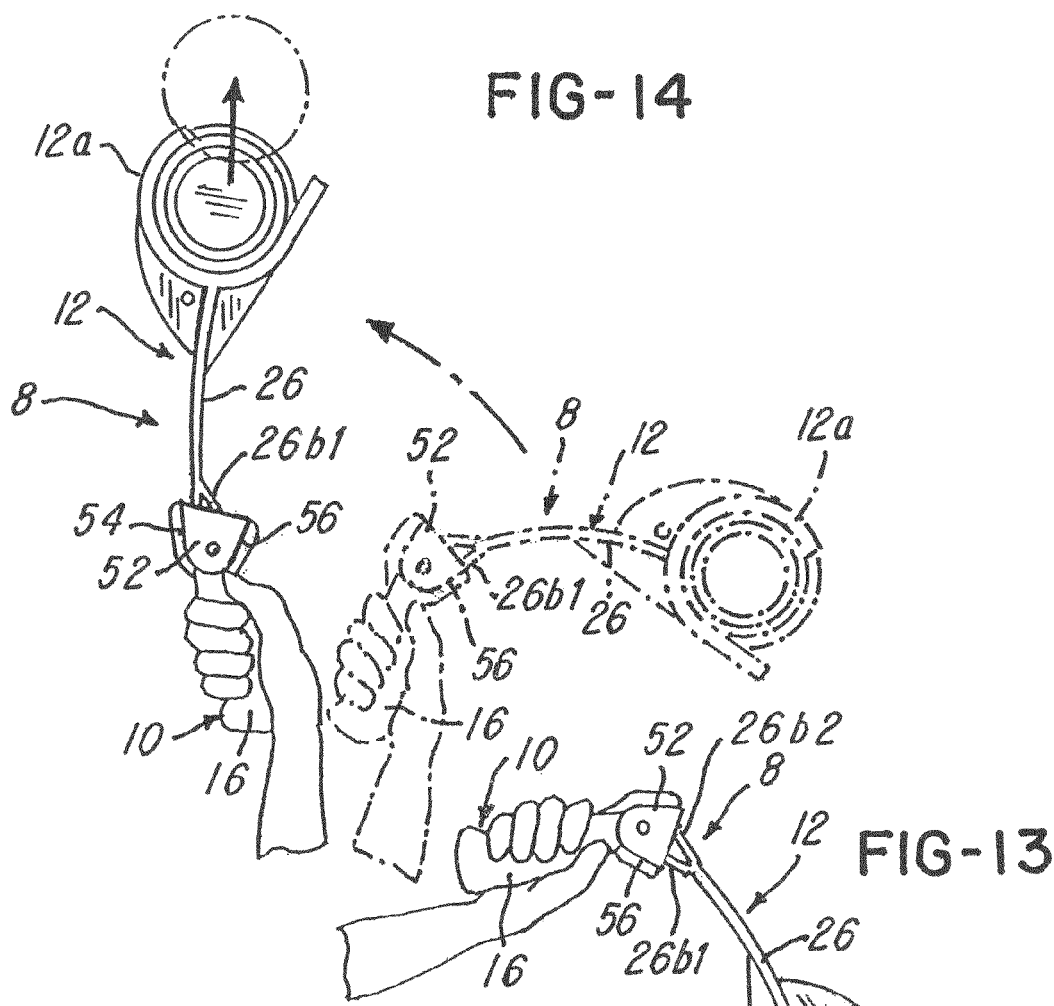
FIG-14
FIG-13
FIG-12
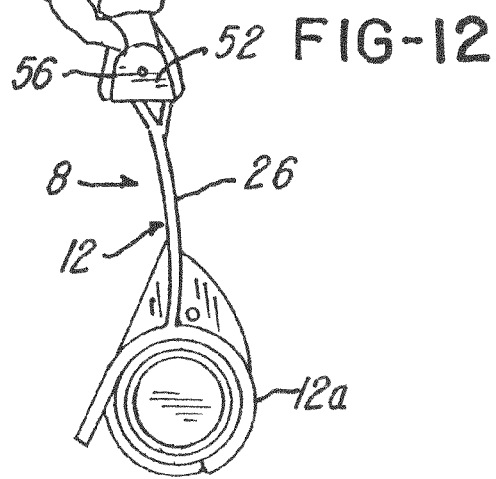

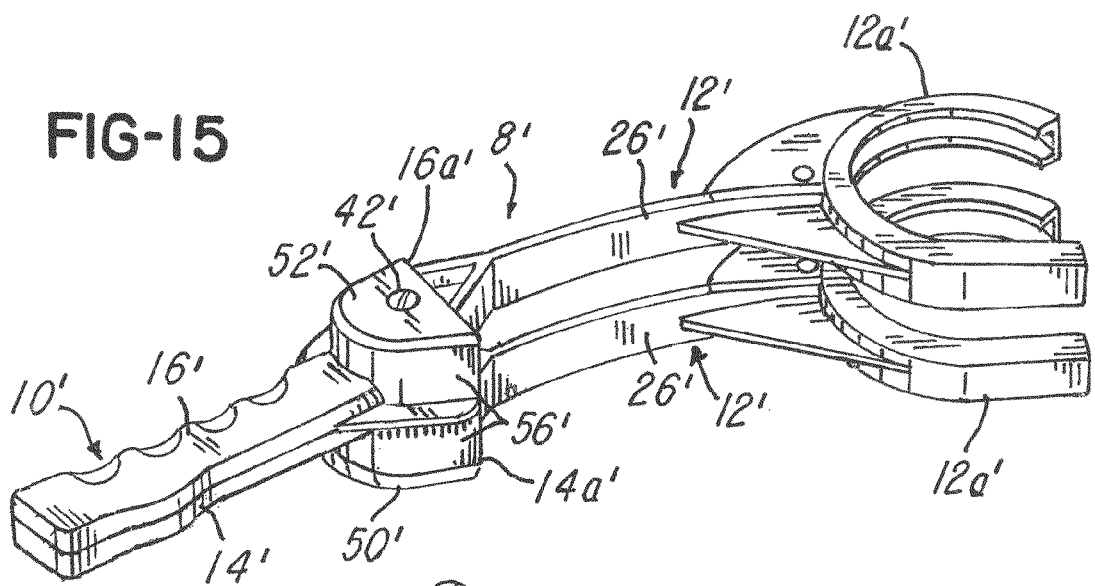
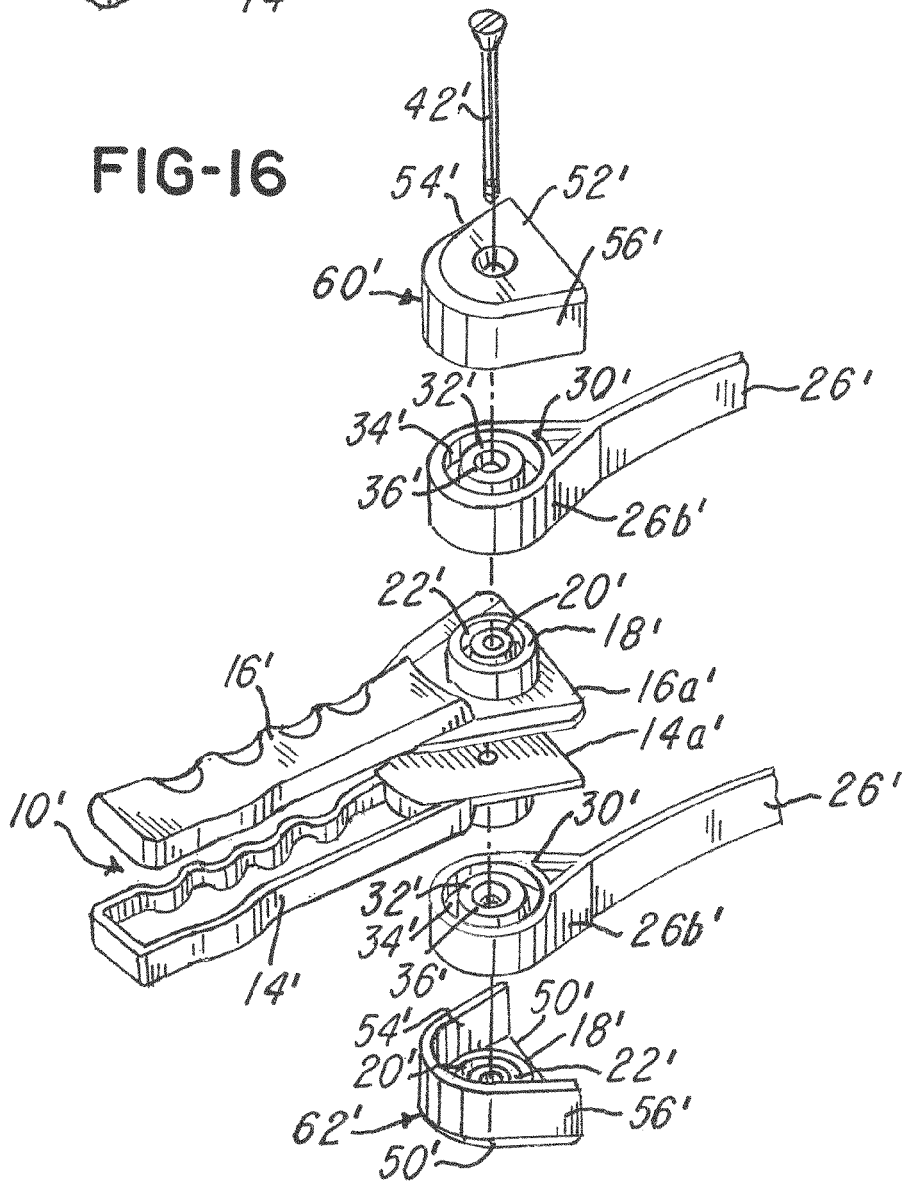

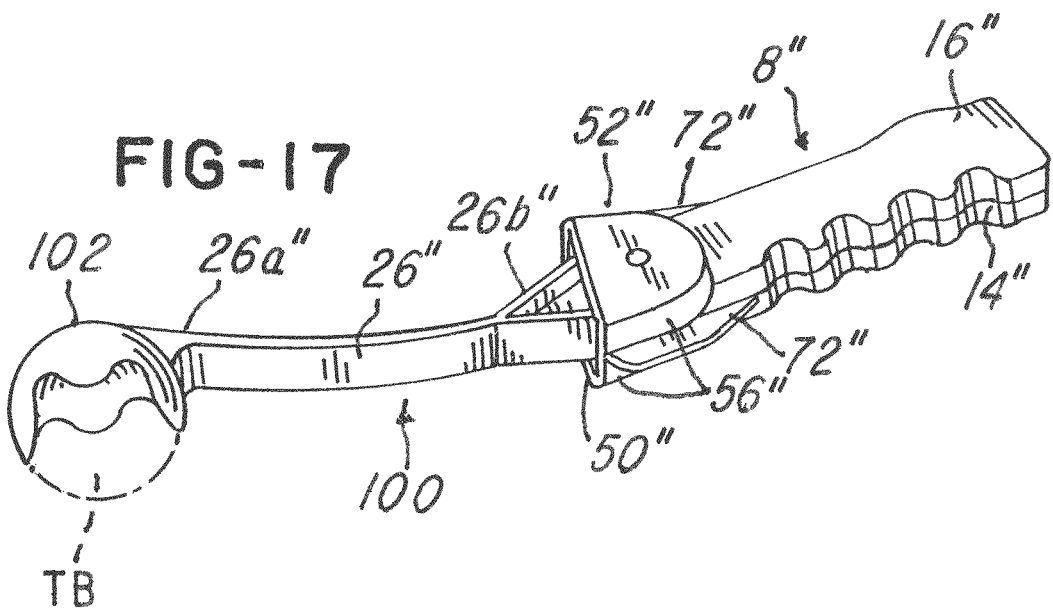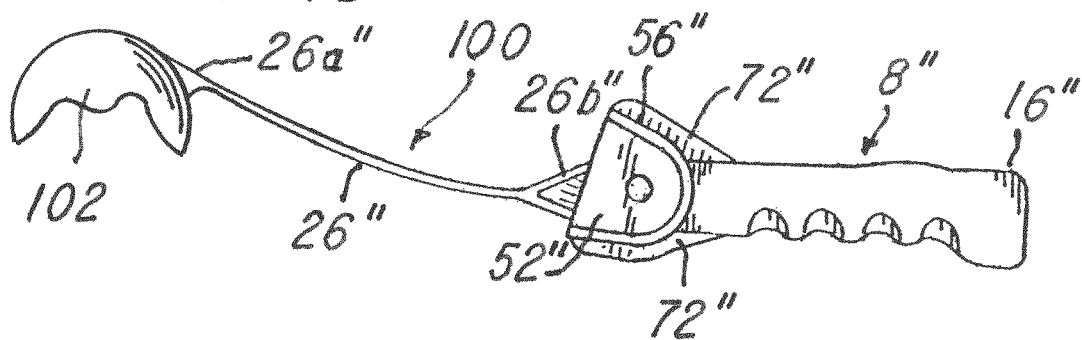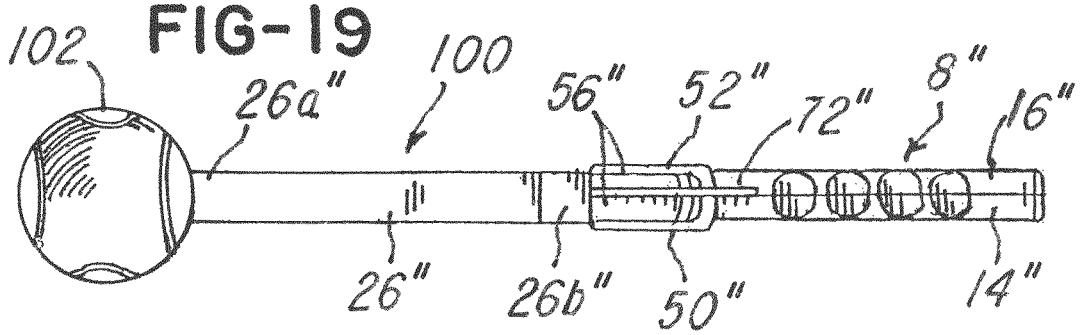

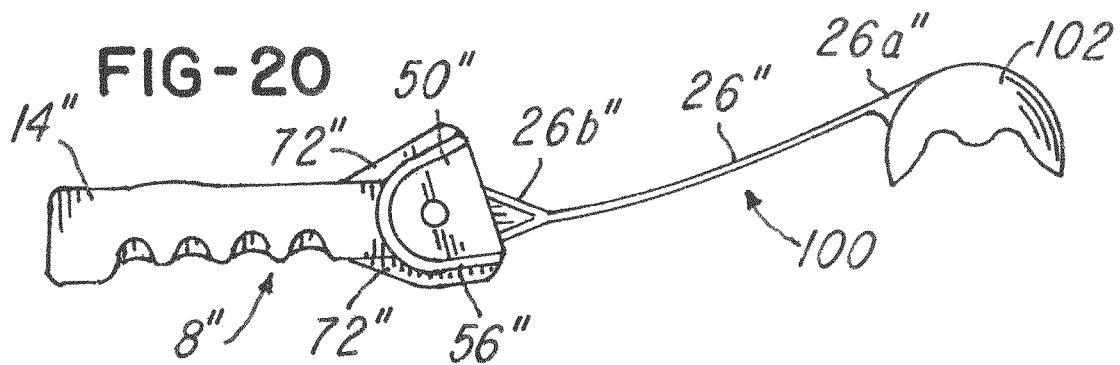
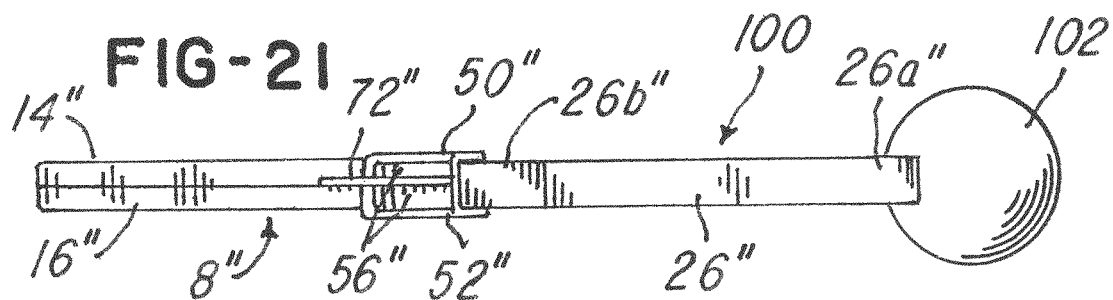
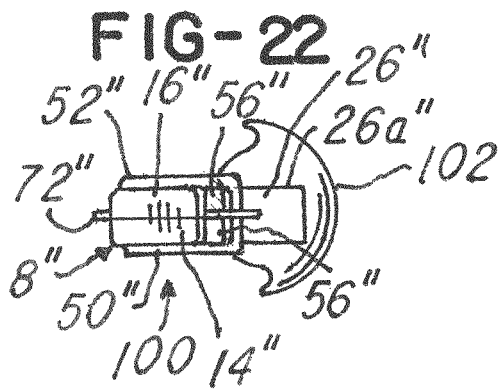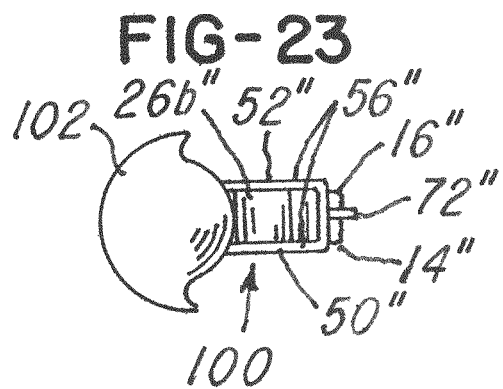

CLAY BIRD THROWER

CROSS-REFERENCE TO RELATED APPLICATIONS

The present application is a divisional of U.S. application Ser. No. 12/871,111 filed Aug. 30, 2010 and claims priority to provisional U.S. Application Ser. No. 61/257,252 filed Nov. 2, 2009, to which Applicant claims the benefit of the earlier filing date. These applications are incorporated herein by reference and made a part hereof.

BACKGROUND OF THE INVENTION

1. Field of the Invention

This invention relates to throwers and, more particularly, to a thrower for use with targets, such as clay birds, toys, balls and the like.

2. Description of the Related Art

In the sport of trap and skeet shooting, a clay bird or "pigeon" is thrown into the air and a shooter attempts to shoot the target before it hits the ground. Points are accumulated for number of targets hit.

In the past, there have been many devices for throwing the clay birds and U.S. Pat. Nos. D249,815; D524,901; 1,700,880; 4,076,004; 4,222,361; 4,233,952; 4,347,828; 4,548,413; 4,730,595; 4,974,574; 4,984,556; 5,515,835; 5,390,652; 5,465,704; 5,515,835; 5,537,985; 5,579,748; 6,076,829 and 7,523,915.

In the area of hand-held clay throwers, it is always desired to provide throwers that can throw the clay targets at a very high velocity or speed and at great distances. There is also a desire to have the targets released with no or minimal "wobble" which can be caused by a relative movement of the target holding of a handheld thrower relative to its handle. For example, if the target holder rotationally twists or flexes about the longitudinal axis of the thrower during a throw, the target can be released in a plane that is not co-planar with the plane in which the handheld thrower is moving. This can result in an improperly released or wobbling target.

There is, therefore, a need to provide an improved hand thrower that facilitates releasing targets at a velocity and at greater distances than integrally-formed plastic hand throwers of the past and to also provide a hand thrower that provides a pivotal connection that facilitates reducing any wobble effect when the target is released from the hand thrower.

SUMMARY OF THE INVENTION

It is, therefore, a primary object of the invention to provide an improved hand thrower that facilitates releasing targets or objects at a greater velocity and/or at greater distances compared to integrally-formed plastic hand throwers of the past.

Another object of the invention is to provide a hand thrower that provides a pivotal and free-moving connection between the target holder and the handle.

Still another object of the invention is to provide a pivotal connection that is situated a predetermined distance from an end of the handle so as to maximize the whiplash or catapulting release of the target.

Still another object of the invention is to provide a pivotal connection that is approximately 25-35% or less than they pivot (30%) of a distance from an end of the hand held thrower to facilitate maximizing the release of the target from the target holding end of the thrower.

Still another object of the invention is to provide a hand held thrower that has a handle and a plurality of target holders that are pivotally and freely connected to the handle.

Still another object is to provide a hand thrower that utilizes a "catapult" to launch objects.

In one aspect, one embodiment of the invention comprises a clay bird thrower comprising a handle, a target holder for receiving a clay bird and a pivot connection for pivotally connecting the handle and the target holder.

In another aspect, one embodiment of the invention comprises a target thrower comprising a handle having an integrally formed handle coupling end and a start-of-throw wall and a target holder having a target holder end for holding a target and an opposing end having an integrally formed holder coupling end, and a generally elongated portion coupling the target holder end to the opposing end, the target holder end having an arcuate portion and a generally opposing elongated portion that cooperate to releasably hold the target, the holder coupling end and the handle coupling end being adapted to mate and pivotally couple the handle to the target holder so that when the target holder is in a start position, the generally elongated portion of the target thrower engages the start-of-throw wall so that when the handle is caused to be moved toward a release position, the target holder end pivots about a pivot axis associated with the handle to enable the momentum of the target holder to release the target.

In still another aspect, another embodiment of the invention comprises a thrower comprising a handle having an integrally formed handle coupling end and a start-of-throw wall and an object holder having a holder end for holding an object to be thrown and an opposing end having an integrally formed holder coupling end, and a generally elongated portion coupling the object holder end to the opposing end, the object holder end having an arcuate portion and a generally opposing elongated portion that cooperate to releasably hold the object, the holder coupling end and the handle coupling end being adapted to mate and pivotally couple the handle to the object holder so that when the object holder is in a start position, the generally elongated portion of the thrower engages the start-of-throw wall so that when the handle is caused to be moved toward a release position, the object holder end pivots about a pivot axis associated with the handle to enable the momentum of the object holder to release the object.

These and other objects and advantages of the invention will be apparent from the following description, the accompanying drawings and the appended claims.

BRIEF DESCRIPTION OF THE ACCOMPANYING DRAWINGS

FIG. 1 is a view of one embodiment of the invention;

FIG. 2 is a plan view of the embodiment shown in FIG. 1;

FIG. 3 is a right side view of the embodiment shown in FIG. 1;

FIG. 4 is a bottom view of the embodiment shown in FIG. 1;

FIG. 5 is another side view of the embodiment shown in FIG. 1;

FIGS. 6 and 7 are end views of the embodiment shown in FIG. 1;

FIGS. 8 and 9 are fragmentary views illustrating a pivotal connection;

FIG. 10 is a sectional view taken along the line 10-10 in FIG. 8;

FIG. 11 is an exploded of the embodiment shown in FIG. 1;

FIGS. 12-14 are various views illustrating a user holding and using the target thrower;

FIG. 15 is a view of another embodiment of the invention showing a dual thrower;

FIG. 16 is an exploded view of the embodiment shown in FIG. 15; and

FIGS. 17-23 show another embodiment of the invention showing the target holder adapted to receive a tennis ball or baseball.

DETAILED DESCRIPTION OF THE PREFERRED EMBODIMENTS

As illustrated in FIGS. 1-16, a thrower 8 is shown. In a preferred embodiment, the thrower 8 is adapted to throw artificial or clay birds used in skeet and trap shooting, but it could be adapted to throw other objects or items, such as balls, discs, toys, pet toys and the like. The thrower 8 comprises a handle 10 and a target holder 12 that is pivotally connected to the handle 10 as shown. The handle 10, as illustrated in FIGS. 8-10, is a two-piece construction comprising a first handle portion 14 and a mating second handle portion 16.

The thrower 8 further comprises an elongated arm or portion 26 that is integrally formed with the target holder 12 at an end 26a of the arm 26. Notice that the thrower 8 comprises a thrower length TL (FIG. 3). The target holder 12 comprises a target holder end or head 12a that is configured and adapted to releasably receive the clay target (shown in imaginary lines). The target holder end 12a has two generally opposed semi-circular walls 12a1 and 12a2 (FIG. 11) adapted to releasably receive an object such as a clay bird. In this regard, the thrower 8 may comprise one or more of the features illustrated in U.S. Pat. Nos. 4,076,004 and 5,390,652, both of which are assigned to the same assignee as the present application and which are incorporated herein by reference and made a part hereof.

The first and second handle portions 14 and 16 each comprise a first annular bearing or pivoting surface 18 and a second annular bearing, pivoting surface or protrusion 20 that cooperate to define a first receiving area 22 and a second receiving area 24. At an end 26b of the elongated arm 26, a third annular bearing or pivoting surface 30 and a fourth annular bearing or pivoting surface 32 are integrally formed as shown. The third and fourth bearing or pivoting surfaces 30 and 32 are adapted to pivotally mate with the first annular bearing or pivoting surface 18 and the second annular bearing surface or protrusion 20 when they are received in the first and second receiving areas 22 and 24. The pivot connection formed by the pivoting surfaces 18, 30, 32 and protrusion 20 enable the elongated arm 26 to pivot about the pivot axis PA (FIG. 3). In one embodiment, the pivot connection and pivot axis PA are situated a predetermined pivot distance from a bottom end 10a. In one embodiment, the predetermined pivot distance is less than thirty percent of the total distance TL. In another embodiment, the pivot axis is situated approximately 25-35% of the total distance TL from the bottom end 10a of the target holder handle 10.

In the illustration being described, notice that the bearing or pivoting surfaces 30 and 32 may comprise or be defined by a pair of annular rings that are integrally formed in the end 26a of the arm 26 as illustrated in FIG. 8. It should be understood that the handle portion 16 comprises the protrusion 20, bearing or pivoting surfaces 30 and 32 at the end 26b of the elongated arm 26 that cooperate to define a third receiving area 34 and fourth receiving area 36. Notice in FIG. 11 that the first and second annular bearing or pivoting surfaces 18 and 20 cooperate and mate with the third and fourth annular bearing or pivoting surfaces 30 and 32 to provide the pivot connection for pivotally connecting the handle 10 to a target holder 12 as shown. The pivot connection provides a pivot joint that enables free or flopping movement of the elongated arm 26 and target holder 12 to the handle 10. As illustrated in FIGS. 8 and 9, the pivot connection enables the elongated arm 26 to pivot between a start-of-throw position (FIGS. 8 and 13) and a release position (FIGS. 9 and 14). Again, and as illustrated in FIG. 10, the third and fourth annular bearing or pivoting surfaces 30, 32 are adapted to pivotally mate so that the elongated arm 26 and target holder 12 may pivot about the pivot axis PA (FIG. 3). Notice that the pivot axis PA is generally perpendicular to an imaginary plane in which the thrower 8 moves when it is being actuated or used as described herein.

As illustrated in FIG. 4, at least one or a plurality of screws or fasteners 40 are screwed into the handle portions 14 and 16 to secure the handle portions 14 and 16 together. Another screw 42 or pin (not shown) may be used to capture and pivotally secure the elongated arm 26 to the handle 10. In one embodiment, note that the protrusion or projection 20 comprises and defines an aperture 46 (FIG. 10) that threadably receives the screw 42. In this regard, it is preferred that the aperture 46 (FIG. 9) and the inner wall 20a (FIG. 10) of the protrusion 20 comprise a diameter that is slightly smaller than the screw 42 thread diameters so that the screw 42 can cooperate to secure the handle portions 14 and 16 together while pivotally capturing the end 26b of the elongated arm 26 in the handle 10 as shown. Although not shown, other means for securing the elongated arm 26 to the handle 10 and for securing the handle portions 14 and 16 together may be provided. For example, the handle portions 14 and 16 could be secured together with an integral detent, adhesive or hot weld or other means for securing the handle portions 14 and 16 together.

The applicant has found that this construction and the plurality of bearings 18, 30, 32 and protrusion 20 permit the pivot arm 26 to pivot freely so that an imaginary plane in which the target holder 12 lies during a throw remains generally coplanar with the imaginary plane in which the thrower 8 moves during the throw. In other words, there is generally little or no rotational movement of the target holder 12 about or relative to the longitudinal axis of the handle 10. This reduces or eliminates the target or object being released in a wobbling fashion which occurs in many prior art devices resulting from a twisting of the target holder 12 relative to its handle 10. The separation of the target holder 12 from the pivot axis PA associated with the handle 10, which is integrally formed in the elongated arm 26, enables much freer relative movement compared to one-piece integral throwers of the past. The structure configuration of the pivotal connection by the annular bearings 18, 30, 32 and protrusion 20 between the handle 10 and the target holder 12 facilitates reducing or eliminating wobble or a twisting of the target holder 12 relative to the handle 10.

Another feature of one embodiment is its use of a catapult effect. Note that the handle portions 14 and 16 comprise ends 14a and 16a, respectively, that provide or comprise walls or surfaces 50, 52, 54 and 56 as illustrated in FIGS. 8-11. The wall 56 provides a starting position stop or surface 56a (FIG. 9) against which the arm 26 or a portion, such as surface 26b1, of the arm 26 engages at the start of the throw as illustrated in FIGS. 5, 9 and 13. As best illustrated in FIGS. 8 and 9, note that when the elongated arm 26 moves from the start-of-throw position, shown in FIG. 8, to the end-of-throw position, shown in FIG. 9, the surface 26b1 engages the interior wall or surface 54a (FIG. 8) and abruptly stops the movement of that portion of the elongated arm 26 during the throw. The elongated arm 26 is molded from plastic and rigid, yet elastic and resilient, and the target holder end 12a briefly continues its movement until the target is released, as illustrated in FIG. 14, and the clay target is catapulted out of the target holder 12. The centrifugal force and sudden stop of the end 26b relative to the end 26a facilitates causing the target to be released or catapulted from the target holder 12.

FIGS. 12-14 illustrate the use of the thrower 8. As illustrated in FIG. 12, a user places a clay pigeon, target or object in the target holder 12 and positions the holder 12 such that the surface 26b1 engages the wall 56 (FIGS. 8, 11 and 13). The user actuates or moves the thrower 8 as shown in FIGS. 13-14 and the surface 26b2 engages the surface 54a (FIG. 8) of wall 54, abruptly stopping that surface's movement relative to the wall 54 and the target holder 12 then releases the target in response thereto.

It has been found that the elongated arm 26 and the pivotal connection between the target holder 12 and the handle 10 enables the target holder end 12a to be actuated at a much higher speed than the clay throwers of the past. It has also been found that the throwing distance or swing (e.g., the distance between the positions shown in phantom and the release position in FIG. 14) to achieve a throw of a desired velocity or length is much less than prior art devices. Applicant has found that having the elongated portion 26 integrally formed in the target holder end 12a and those two components separate from, but pivotally secured to, the handle 10 such that the elongated portion 26 and target holder 12 can pivot freely about the pivot axis PA (FIG. 3) facilitates creating much higher centrifugal force and higher target thrower speed (at least 10% higher than some prior-art one-piece throwers) while using less travel distance. This enables a user to achieve throwing the clay birds or other objects at higher speeds and greater distances than one-piece integral prior art throwers of the past.

It should also be understood that the configuration of the thrower 8 in FIGS. 10 and 11, namely the circular and concentric bearings 18, 30 and 32 along with the projection 20 provides a stable pivotal connection between the target holder 12 and the handle 10 so that the target holder 12 pivots about the axis PA substantially perpendicular to the longitudinal axis of the handle 10 and does not, for example, twist or flex in an undesired direction about the longitudinal axis of the arm 26 or handle 10, which can cause the target to "wobble" or be released in an unstable manner. As mentioned earlier, one of the problems with the prior art devices was that the elongated arms used in those devices were oftentimes an integrally formed extension of the handle 10 and the arms 26 could twist or flex which would cause the target or object to wobble when released.

Advantageously, the thrower 8 comprises the pivoting extended arm 26 and launching head 12a connected to the gripping handle 10 that allows a wide range ratios secondary action. The throwing head 12a and arm 26 are designed to grip the clay target in the semi-circular channeled head 12a that offers some resistance to releasing. The arm 26 is lengthened and arched to create both drag and centrifugal force. The launch head 12a and arm 26 are attached to the handle 10 by the pivoting joint that allows for free or flopping movement of head 12a and arm 26. The combination head 12a and launch arm 26 and handle 10 are constructed of a semi-rigid plastic. The thrower 8 is designed to release a spinning disk, target or object when swung in an arc by the person grasping the handle as shown in the Figures. Note that the thrower 8 may comprise one or more strengthening ribs 70, 72 (FIGS. 8 and 9). Further, Applicant has found that the pivoting arm makes a more constant throw with less wobbles. The thrower 8 takes 20-30% less effort to throw compared to prior art one-piece throwers. Also, the secondary rotation or pivot of the target holder 12 minimizes throwing defects caused by the throwers. The thrower 8 requires less effort to throw the same distances.

FIGS. 15 and 16 illustrate another embodiment showing a dual thrower 8' wherein two elongated arms 26' are provided so that the user can throw multiple birds with one throw. In this embodiment, like parts are identified with the same part numbers except that a prime mark ("'") has been added to the part numbers in FIGS. 15 and 16. The structure and operation of the embodiments shown in FIGS. 15 and 16 is substantially the same as the embodiment shown in FIGS. 1-14, except that two elongated arms 26' having the target holders 12' are mounted in the handle 10' as shown. In a preferred embodiment, the elongated arms 26' are pivotally connected to the handle 10' similar to the arrangement in the prior embodiment, with a single screw or pin 42' extending through the assembly.

As illustrated in FIGS. 15 and 16, the significant differences between this embodiment and the embodiment described relative to FIGS. 1-11 is that this embodiment comprises a plurality of throwers with multiple elongated arms 26' and multiple target holders 12'. In the illustration being described, the handle 10' is comprised of the first and second handle portions 14' and 16', which could be provided in a single integral construction if desired. In this embodiment, note that the annular rings 18' and the protrusion 20' are integrally formed to provide the first receiving area 22'. The elongated arm 26' is formed and provided in substantially the same manner as described earlier herein relative to the embodiment of FIGS. 1-11. In this embodiment, the walls 52', 54' and 56' may be provided in separate end caps 60' and 62' that are not integrally formed with the first and second handle portions 14' and 16' in the illustration being described. Of course, other arrangements and configurations for fixing the elongated arm(s) 26 and 26' to the handle(s) 10 and 10', respectively, could be used without departing from the true spirit and scope of the invention.

In the embodiment of FIGS. 15 and 16, note that the screw 42' secures the various components together as shown. In this regard, note that the protrusions 20' in the first and second handle portions 14' and 16' are adapted and dimensioned to enable the screw 42' to pass through until the threaded portion of the screw 42' can be threaded into the protrusion of the end cap 62' which may be threaded or may be provided for securing the components together.

It should be understood that the features of the embodiment shown herein may be used with the clay target holders commonly used in trap and skeet shooting. It is also envisioned that the target holder 12 at the target holder end 12a may be adapted to accommodate other types of targets, objects or items to be thrown, such as balls (e.g., tennis balls, baseballs, soft balls, golf balls, cricket balls, beach balls, rubber balls, wiffle balls and the like), rotating disks, toys, pet exercise or training toys or the like.

FIGS. 17-23 are views showing another embodiment of the target holder 12 adapted to receive a tennis ball or baseball. Like parts are identified with the same part numbers, except a double prime ("''") has been added to the part numbers of this embodiment. Notice that a thrower 100 has a holder 102 that is partially spherical and generally spherical shaped. The holder 102 is formed and adapted to receive, for example, the tennis ball (labeled TB in FIG. 17 and shown in phantom). Of course, other shaped heads or target holders may be provided without departing from the scope of the invention, depending on the object being thrown. Notice that the thrower 100 has the save pivot connection connecting the arm 26" and the holder 102.

Other advantages include providing the thrower 8 with one or more of the following features:

A handle comprising a thrower length, a pivot connection may be situated at a pivot distance from an end of the handle of less than thirty percent of said thrower length.

The pivot connection may be defined by a plurality of annular rings or ribs integrally formed in at least one of said target holder or said handle.

The pivot connection may be defined by a plurality of annular rings or ribs integrally formed in each of the target holder and the handle.

The target holder may comprise an end with a first pair of annular ribs or rings defining a plurality of receiving areas, said handle may comprise a second pair of annular ribs or rings adapted to mate with said first pair of annular ribs or rings and be received in the plurality of receiving areas to provide the pivot connection.

The handle may not be integral with the target thrower and the pivot connection may be adapted to permit the target thrower to pivot freely about a pivot axis.

The pivot axis may be located approximately 25-35% of a total distance from a bottom of the handle to an end of the target holder.

The handle may comprise an opening defined by a plurality of walls, the plurality of walls may comprise a first end wall for engaging at least a portion of the target holder at a start of a throw, and a second end wall, the first and second end walls may be situated at a predetermined angle A (FIG. 11) relative to each other.

The predetermined angle A (FIG. 11) may be less than forty five degrees.

The target holder may comprise an end having an integrally formed annular wall adapted to define a pivot opening, the handle may comprise an end having an integrally formed pivot protrusion, the pivot protrusion may be adapted to be received in said pivot opening to define the pivot connection.

The handle may comprise a thrower length, said pivot axis may be situated at a pivot distance from an end of said handle of twenty to twenty five percent of the thrower length.

At least one of the holder coupling end or the handle coupling end may comprise a plurality of annular rings or ribs integrally formed therein.

The holder coupling end and the handle coupling end may comprise a plurality of annular rings or ribs integrally formed in each of the clay target holder and the handle.

The holder coupling end may comprise a first pair of annular ribs or rings defining a plurality of receiving areas, the handle may comprise a second pair of annular ribs or rings adapted to mate with the first pair of annular ribs or rings and be received in the plurality of receiving areas to enable the clay target holder to pivot about the pivot axis.

The handle may not be not integral with the clay target holder and the holder coupling end and the handle coupling end may be adapted to permit the target thrower to pivot freely about the pivot axis.

The pivot axis may be located approximately 25-35% of a total distance from a bottom of the handle to an end of the clay target holder.

The handle may comprise an opening defined by a plurality of walls, the plurality of walls may comprise the start-of-throw wall for engaging at least a portion of the clay target holder at a start of a throw, and a second end wall, the first and second end walls may be situated at a predetermined angle relative to each other.

The predetermined angle may be less than forty five degrees.

The target holder may comprise an end having an integrally formed annular wall adapted to define a pivot opening, the handle may comprise an end having an integrally formed pivot protrusion, the pivot protrusion may be adapted to be received in the pivot opening to define the pivot connection.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A clay bird thrower comprising:
a handle;
a target holder for receiving a clay bird; and
a pivot connection for pivotally connecting said handle and said target holder;
wherein said pivot connection is defined by a plurality of annular rings or ribs, at least one first one of said plurality of annular rings or ribs being integrally formed in said target holder and at least one second one of said plurality of annular rings or ribs being integrally formed in said handle, said at least one first one of said plurality of annular rings or ribs in said target holder cooperating or mating with said at least one second one of said plurality of annular rings or ribs in said handle to provide said pivot connection;
wherein said target holder comprises a plurality of elongated arms and target holders, each of said plurality of target holders being pivotably connected to said handle.

2. The clay bird thrower as recited in claim 1 wherein said pivot connection is defined by a plurality of annular rings or ribs integrally formed in each of said target holder and said handle.

3. The clay bird thrower as recited in claim 1 wherein a portion of at least one of said plurality of elongated arms engages a second end wall after having engaged a first end wall in response to a user actuating said handle from a start of a throw to an end of said throw, said portion abruptly stops relative to said handle and said target holder continues movement, thereby causing said target to be released.

4. The clay bird thrower as recited in claim 3 wherein an end of said target holder has a first plurality of walls that are generally perpendicular to an imaginary plane in which said clay bird thrower is actuated during use, said handle having a second plurality of walls that are generally perpendicular to a longitudinal axis of said handle, said first and second plurality of walls being adapted to complement and mate to define said pivot connection.

5. A thrower comprising:
a handle having an integrally formed handle coupling end and a start-of-throw wall; and
an object holder having a holder end for holding an object to be thrown and an opposing end having an integrally formed holder coupling end, and a generally elongated portion coupling said object holder end having an arcuate portion and generally opposing elongated portion that cooperate to releasably hold said object; said holder end being configured and sized to releasably receive at least one of a ball, said ball is a tennis ball, baseball, softball, golf ball, cricket ball, beach ball, rubber ball, wiffle ball or the like;

said holder coupling end and said handle coupling end being adapted to mate and pivotally couple said handle to said object holder so that when said object holder is in a start position, said generally elongated portion of said thrower engages a start-of-throw surface so that when said handle is caused to be moved toward a release position, said object holder end pivots about a pivot axis associated with said handle to enable the momentum of said object holder to release said object;

wherein said pivot axis is defined by a plurality of annular rings or ribs, at least one first one of said plurality of annular rings or ribs being integrally formed in said object holder and at least one second one of said plurality of annular rings or ribs being integrally formed in said handle, said at least one first one of said plurality of annular rings or ribs in said object holder cooperating or mating with said at least one second one of said plurality of annular rings or ribs in said handle to provide said pivot axis.

6. The thrower as recited in claim 5 wherein said handle comprises a thrower length, said pivot axis being situated at a pivot distance from an end of said handle of 20-25% of said thrower length.

7. The thrower as recited in claim 5 wherein said at least one of said holder coupling end or said handle coupling end comprises a plurality of annular rings or ribs integrally formed therein.

8. The thrower as recited in claim 7 wherein said plurality of annular rings or ribs are integrally formed in each of said object holder and said handle.

9. The thrower as recited in claim 5 wherein said holder coupling end comprises a first pair of annular ribs or rings defining a plurality of receiving areas, said handle comprising a second pair of annular ribs or rings adapted to mate with said first pair of annular ribs or rings and be received in said plurality of receiving areas to enable said object holder to pivot about said pivot axis.

10. The thrower as recited in claim 5 wherein said handle is not integral with said object holder and said holder coupling end and said handle coupling end are adapted to permit said thrower to pivot freely about said pivot axis.

11. The thrower as recited in claim 10 wherein said pivot axis is located approximately 25-35% of a total distance from a bottom of said handle to an end of said object holder.

12. The thrower as recited in claim 5 wherein said handle comprises an opening defined by a plurality of surfaces, said plurality of surfaces comprising said start-of-throw surface for engaging at least a portion of the object holder at said start of a throw, and a second end surface, said start-of-throw surface and said second end surface being situated at a predetermined angle relative to each other.

13. The thrower as recited in claim 12 wherein said object holder engages said second end surface at an end of the throw and causes an object to be catapulted out of said object holder.

14. The thrower as recited in claim 12 wherein said predetermined angle is less than forty five degrees.

* * * * *

UNITED STATES PATENT AND TRADEMARK OFFICE
CERTIFICATE OF CORRECTION

Page 1 of 1

PATENT NO. : 8,887,707 B2
APPLICATION NO. : 13/964265
DATED : November 18, 2014
INVENTOR(S) : Allen J. Minneman et al.

It is certified that error appears in the above-identified patent and that said Letters Patent is hereby corrected as shown below:

In the claims

Claim 5, Column 8, line 61, after "end" insert --to said opposing end, said object holder end--.

Signed and Sealed this
Twenty-second Day of December, 2015

Michelle K. Lee
*Director of the United States Patent and Trademark Office*